United States Patent [19]

Graham et al.

[11] 3,904,558

[45] Sept. 9, 1975

[54] PREPARATION OF LATEX FOAM RUBBERS AND FILMS

[75] Inventors: Everett Steadman Graham; Ernest George Pole, both of Sarnia, Canada

[73] Assignee: Polysar Limited, Sarnia, Canada

[22] Filed: May 31, 1974

[21] Appl. No.: 474,962

Related U.S. Application Data

[63] Continuation-in-part of Ser. Nos. 372,502, June 22, 1973, abandoned, and Ser. No. 372,521, June 22, 1973, abandoned.

[52] U.S. Cl. ...... 260/2.5 L; 260/2.5 H; 260/2.5 HB; 260/4 R; 260/4 AR; 260/29.7 UA; 260/29.7 H; 260/723; 260/887; 260/890; 260/892; 428/96; 428/315
[51] Int. Cl... C08f 47/08; C08c 17/08; C08d 13/08
[58] Field of Search .... 260/723, 724, 2.5 L, 29.7 P, 260/29.6 MP, 29.7 UA, 29.7 H; 161/67, 159

[56] References Cited
UNITED STATES PATENTS

| | | | |
|---|---|---|---|
| 3,645,926 | 2/1972 | Dunlop | 260/2.5 L |
| 3,719,614 | 3/1973 | Wright | 260/2.5 L |

*Primary Examiner*—Morton Foelak
*Attorney, Agent, or Firm*—Stevens, Davis, Miller & Mosher

[57] ABSTRACT

An amine-sulfamate is added to a natural rubber latex or a latex of a rubbery $C_4$–$C_{10}$ conjugated diene polymer in which the rubbery polymer particles are maintained in a dispersed state by an emulsifier which forms water-insoluble compounds on reaction with zinc or cadmium ions to form a latex composition which is suitable for use in the preparation of latex foam rubbers and films. The composition is stable to storage at ambient temperatures for lengthy periods of time. To prepare the foam rubber, the amine-sulfamate-containing latex is compounded with (1) a material which supplies zinc or cadmium ions such as an oxide or carbonate of zinc or cadmium, (2) ammonia or a compound which releases ammonia on heating, (3) a vulcanization system for the rubbery polymer and (4) other materials such as foaming agents, sensitizing agents, antioxidants, fillers, thickeners, etc. as required and then foamed, shaped and heated to cause gelation, drying and vulcanization. A water soluble $C_1$–$C_8$ alkyl or alkanol amine containing 1–5 amino groups can be substituted for part of the ammonia. By omitting the foaming step, films can be obtained.

10 Claims, No Drawings

PREPARATION OF LATEX FOAM RUBBERS AND FILMS

This application is a Continuation-in-Part of our prior application Ser. No. 372,502 filed June 22, 1973 and our prior application Ser. No. 372,521 filed June 22, 1973, both of which are now abandoned.

BACKGROUND OF THE INVENTION

This invention relates to the preparation of foam rubbers and films from latices of rubbery polymers. More particularly, it relates to the means employed for gelling the wet latex composition on exposure to elevated temperatures.

In preparing latex foam rubber, a suitably compounded latex composition is converted into a foam which is then shaped and heated to effect drying and vulcanization of the rubbery polymer. Special means are used to prevent collapse of the cellular structure of the wet foam during the shaping and drying steps. Thus, a foaming agent in the form of extra emulsifier is usually added to help in maintaining the foam structure and to help in providing the required viscosity and cell size characteristics. Frequently, a gelling agent is also added to cause the dispersed rubber particles in the latex to become associated as a continuous phase i.e. to gel in the form of a three dimensional network. These gelling agents are commonly classified into two types, (1) the delayed action gelling systems in which the gelation takes place in a predetermined and controllable time interval after the addition of the gelling agent without any substantial change in temperature and (2) the heat gelling systems in which the latex is conditioned by sensitizing agents and the gelation is brought about by the application of heat. This classification is somewhat arbitrary and is made solely for convenience since the delayed-action systems, as exemplified by sodium silicofluoride, have rates which are also temperature dependent while the heat gelling systems, as exemplified by the zinc oxide-ammonia-ammonium salt systems, cause a slow destabilization and gelation at room temperature and thus are also time dependent. It is theorized that the chain of reactions initiated by heating a foamed latex composition containing zinc oxide, ammonia and an ammonium salt includes solubilization of the zinc oxide by the ammonium salt so that the zinc oxide behaves as zinc hydroxide, the zinc ions liberated by dissociation are complexed by the free ammonia to form zinc-amine ions which in turn dissociate to form amine ions and hydrated zinc ions. The resultant free zinc ions interact with the latex-stabilizing component to form water-insoluble zinc derivatives thus destabilizing the latex and causing gelation of the polymer particles into the cellular structure of the foam rubber. With natural rubber latex, the zinc derivatives are probably zinc proteinates while with synthetic latices they are believed to be zinc soaps.

In the zinc oxide-ammonia-ammonium salt heat gelling systems, it is known to use as the ammonium salts, ammonium chloride, nitrate, carbonate, sulfate, formate and acetate — see Transactions of the Institution of the Rubber Industry, 23, 104 (1947) Leptit; ibid, 28, 144 (1952) Kraay; ibid, 29, 160 (1953) Newnham and British Pat. No. 391,511. However, latex compositions containing these systems have rather limited storage stability at ambient temperature and may become unstable and grainy in appearance on standing several hours. It is also known to use ammonium polyphosphates — see U.S. Pat. No. 3,719,614. However, these polyphosphate compounds have a low solubility in water and also tend to settle out if the latex compositions are stored without agitation. It is desirable to improve on the above-mentioned characteristics of the prior known heat-gelling systems and products.

SUMMARY OF THE INVENTION

It has now been found that when an amine-sulfamate is added to a latex of a rubbery polymer in which the rubbery polymer particles are maintained in a dispersed state by the presence of adsorbed ions of a suspending agent which is capable of forming water-insoluble species on reaction with zinc and cadmium ions, there is obtained a latex composition of improved suitability for use in the preparation of latex foam rubbers. The composition is stable to storage at ambient temperatures for lengthy periods of time. To prepare the foam rubber, the latex composition is compounded with (1) a material which supplies zinc or cadmium ions such as an oxide or carbonate of zinc or cadmium, (2) ammonia or a compound which releases ammonia on heating, (3) a vulcanization system for the rubbery polymer and (4) other materials such as gelation sensitizers, fillers, thickeners, foaming agents, antioxidants, etc. as required, and then foamed, shaped and heated to cause gelation, drying and vulcanization. The amine-sulfamates have high water solubility and do not settle out when stored without agitation. Thus, the advantages of the present invention are attained by the use of an amine-sulfamate as the ammonium salt in the heat-gelling system.

DETAILED DESCRIPTION

The amine-sulfamates useful in this invention are those which hydrolyze in water when the temperature is raised but which are characterized by little or no hydrolysis at ambient temperatures. The amine radical can be one derived from any amine which has a boiling point in the range of about −35°C to +300°C and preferably between about −35°C to +175°C. Examples of the amines are ammonia, ammonium hydroxide, the $C_1 - C_3$ alkyl and alkylene amines and the $C_2 - C_3$ alkanol amines, such as ethyl amine, monoethanolamine, diethanolamine, propyl amine, amyl amine, hexyl amine, monoisopropanolamine, diisopropanolamine, ethylene diamine and triethylene tetramine. Ammonium sulfamate, along with the $C_2 - C_3$ alkanolamine sulfamates, are the preferred compounds with ammonium sulfamate being most preferred. The amount of the amine-sulfamate which may be used in the process of this invention is in the range of 0.2–30 parts by weight per 100 parts by weight of uncompounded latex solids when it is used with up to 5 parts of added non-reactive emulsifier. A non-reactive emulsifier is one which does not react with zinc and cadmium ions to form water insoluble species. Examples of these emulsifiers are alkali metal alkyl sulfates, sulfonates and sulfosuccinamates, fatty alcohol polyethers, alkylene oxide-alkyl phenol condensates, etc. In the absence of added non-reactive emulsifiers, the amount of amine-sulfamate required to be used is reduced. Thus, with ammonium sulfamate the required amount is reduced to 0.2–8 parts and preferably 0.5–5 parts. If less than 0.2 part is used, there will be insufficient gelation and the foam structure may become coarse or collapse during the drying-curing step. Additionally, if a foam rubber is obtained, it will likely have a skin which forms wrinkle marks when the surface is bent into a concave shape. On the other hand, if more than 8 parts of the ammonium sulfamate are used, the gelation takes place so rapidly that cracks are likely to form in the surface of the foam during pre-heating at 30°–40°C or during drying and curing at higher temperatures. Similar problems are likely to be encountered with the other amine-sulfamates if too much or too little is used in the absence of added non-reactive emulsifier, e.g. with monoethanolamine sulfamate and monoisopropanolamine sulfamate which under these conditions should be used in amounts of 1–15 parts and preferably 2–7 parts. When used, the non-reactive emulsifier retards the rate of gelation. Thus, as the amount used increases, the amount of aminesulfamate required to maintain the rate of gelation increases.

The presence of a compound which provides zinc or cadmium ions such as an oxide or carbonate of zinc or cadmium is essential in the heat-gelling system of this invention. As indicated earlier, the metal ions react with the latex stabilizer to form a water-insoluble derivative and thus destabilize the latex so as to cause gelation of the rubber particles in the foam into a cellular structure. 0.5–20 parts of this compound should be used per 100 parts by weight of uncompounded latex solids. Preferably, the amount should be 2–10 parts.

The third essential component of the amine-sulfamate heat-gelling system is ammonia or a compound which releases ammonia on heating. The ammonia functions as a complexing agent for the metal ions and upon heating releases them in a form suitable for reaction with the latex stabilizer so as to cause destabilization of the latex and coalescence of the rubber particles. The amount of free ammonia should be in the range of 0.1–4.0 parts per 100 parts by weight of uncompounded latex solids and preferably 0.3–2.0 parts. Ammonium hydroxide has been found to be a suitable ammonia donor. An easy way to determine when a sufficient amount of ammonia or ammonia donor has been added is by measurement of pH. Preferably the pH of the latex composition should be at least about 10.0 and more preferably about 10.3 to 11.5. It has been found, however, that when increasing amounts of the previously described nonreactive emulsifiers are added, particularly the non-ionic types, the pH may be as low as 8. It is essential that this alkalinity be mainly from ammonia since when ammonia was omitted and the alkalinity was provided by potassium hydroxide, no appreciable gelation occurred in 1 minute at 30°–40°C and the foam collapsed during the drying-curing step at 149°C. The reason for this is believed to be that there was insufficient ammonia present to form the metalamine complex. However, good results were obtained by substituting a less volatile amine for some of the ammonia and adding it before, at the same time as or after the addition of the sulfamate. This less volatile amine may be a water-soluble $C_1$ to $C_8$ alkyl or alkanol amine containing 1–5 amino groups. Examples of such compounds are methyl and methanol amines; ethyl and ethanol amines; 1,2-diamino ethane; propyl, isopropyl, propanol and isopropanol amines; 1,2- and 1,3-diamino propanes, 1,4-diamino butane; 1,7-diamino heptane; diethylene triamine; triethylene tetramine; tetraethylene pentamine and choline. Addition of about 0.01–4 parts will give acceptable results within the above pH limitations.

The latices to which the heat-gelling system of the present invention may be applied are those in which the rubbery polymer particles are stabilized i.e. maintained in suspension by the adsorbed ions of an emulsifying agent which forms water-insoluble compounds on reaction with zinc or cadmium. These include natural rubber latex, synthetic rubber latices in which water-soluble alkali metal or amine salts of rosin acids or $C_5$–$C_{20}$ saturated or unsaturated carboxylic acids form the major proportion of the emulsifier system and blends of these latices. Examples of these emulsifiers are sodium, potassium, ammonium and monomethylamine stearates, oleates, palmitates, laurates, abietates, and mixtures of such emulsifiers. The rubbery polymers may be homopolymers of $C_4$–$C_{10}$ conjugated dienes such as butadiene; 2-methyl butadiene; 2-chloro butadiene; pentadiene-1,3; 2,3-dimethyl pentadiene-1,3; 2,5-dimethyl hexadiene-1,5, cyclopentadiene and halo-substituted derivatives of these compounds. The rubbery polymers may also be copolymers of the $C_4$–$C_{10}$ conjugated dienes with each other or with one or more copolymerizable monomers containing a $CH_2 = C<$ group such as styrene, acrylonitrile, methacrylonitrile, acrylic acid, methacrylic acid, methyl methacrylate, ethyl acrylate, acrylamide, acrolein, alpha and beta methyl acroleins, maleic acid, fumaric acid, itaconic acid, cinnamic acid, cinnamaldehyde, vinyl chloride, vinylidene chloride, isobutylene, divinyl benzene and methyl vinyl ketone. If desired, the rubbery polymer latices may be blended with minor proportions of latices of resinous polymers with such as polystyrene, polyacrylonitrile, polyvinylidene chloride, polyvinyl chloride, polyvinyl acetate, polymethyl methacrylate, copolymers of the monomers of these resinous polymers and resinous copolymers of these monomers with other copolymerizable monomers such as the $C_4$–$C_{10}$ conjugated dienes. For best results, the starting latices should contain at least 15 weight % total solids before compounding and preferably about 40–75%.

The latex compositions may be used for the production of foam rubber-backed fabrics, particularly carpets, in addition to the manufacture of unattached foam rubber sheeting and molded foam articles. The materials and procedures heretofore used in the production of latex foam rubber articles are generally applicable to the novel latex compositions of the present invention. These materials include gelation sensitizers to sharpen up the point at which gelation takes place, foaming agents and thickeners to provide latex stability during compounding as well as foam stability until gelation takes place and greater uniformity in the foam rubber structure, antioxidants for ageing resistance, fillers and vulcanization systems which include activators, accelerators and vulcanizing agents usually of the sulfur type. In addition to its presence as part of the heat-gelling system, the metal oxide, particularly zinc oxide, is required to be present to function as an activator-accelerator in the vulcanization system.

In preparing the latex compositions, the starting latex is placed under good agitation at ambient temperature and the various components are added. It is not necessary that they be added in any particular order but it is good practice to add the foaming agent prior to the other components. It may be more convenient at times to add the various components in the form of aqueous solutions or dispersions except for the fillers which normally are added in dry form. The amine-sulfamate either by itself or in combination with the other essential components of the novel heat-gelling system of the present invention can be added to the starting latex well before, at the same time as or after the other components have been compounded into the latex. The amine-sulfamate does not cause excessive viscosity increase in the latex on being added to it, thus providing a further advantage for its use over some prior-known heat-gelling compounds.

After compounding has been completed, the latex composition is ready for foaming and further processing into the finished foam rubber product. Depending on whether it is to be used in the production of spread foam or molded foam rubber products, the amount of filler used will vary and the latex composition is foamed to 2–20 times its volume, shaped into the desired configuration and heated to effect gelation, drying and vulcanization. Known means and conditions are used for this purpose.

The following examples are provided to illustrate the invention in greater detail. Unless otherwise noted, all parts and percentages are on a dry basis by weight and all formulations are based on 100 parts of total solids in the uncompounded starting latex.

EXAMPLE 1

A fatty acid soap-stabilized synthetic latex comprising a major proportion of particles of a rubbery copolymer of butadiene and styrene (SBR) having a bound styrene content of 23% and a minor proportion of resinous polystyrene particles, and containing a total solids content of 69.0% and having a pH of 10.3 was compounded and tested using methods common in the art, as indicated in Table I. In preparing the foam rubbers, the latex compositions were foamed to 5 times their volume, spread into a layer 0.63 cm thick, heated for 1 minute at about 35°C under a bank of infra-red lamps to gel the foam and then heated in a forced-air oven at 149°C to dry and vulcanize the foam layers. From this Table, it can be seen that excellent compounded latex compositions can be prepared using the heat-gelling system of the present invention. The latex compositions have viscosities at desirable levels. Compound 4 demonstrates that ammonium sulfamate has no detrimental effect on the latex on subjecting the mixture to a very severe ageing test i.e. 14 days at 50°C. The foam rubber products prepared from these latex compositions had excellent appearance and properties. Compounds 5 and 6 illustrate the polyphosphate heat-gelling systems of the prior art.

TABLE I

| Compound No. | 1 | 2 | 3 | 4 | 5 | 6 |
|---|---|---|---|---|---|---|
| Latex | 100.0 | 100.0 | 100.0 | 100.0 | 100.0 | 100.0 |
| Ammonium sulfamate | 1.5 | 1.5 | 1.75 | 1.8 | — | — |
| Sodium oleate | 1.5 | 1.5 | 1.5 | 2.0 | — | — |
| Potassium oleate | — | — | — | — | 1.5 | 2.0 |
| Triethyl triethylene triamine | 1.0 | 1.0 | 1.0 | 1.0 | 1.0 | 1.2 |
| Ammonia | 1.0 | 1.0 | 1.2 | 1.2 | 1.3 | 1.4 |
| Potassium hydroxide | 0.1 | — | — | — | — | — |
| Zinc diethyldithiocarbamate | 1.5 | 1.5 | 1.5 | 1.5 | 1.5 | 1.5 |
| Zinc mercaptobenzothiazole | 1.0 | 1.0 | 1.0 | 1.0 | 1.0 | 1.0 |
| Sulfur | 2.0 | 2.0 | 2.0 | 2.0 | 2.0 | 2.0 |
| Polymeric hindered phenol | 1.5 | 1.5 | 1.5 | 1.5 | 1.5 | 1.5 |
| Silicone surfactant | 0.25 | 0.25 | 0.25 | 0.25 | 0.25 | 0.25 |
| Aluminum silicate | 100.0 | 100.0 | 100.0 | 100.0 | 100.0 | 100.0 |
| Aluminum trihydrate | 25.0 | 25.0 | 25.0 | 25.0 | 25.0 | 25.0 |
| Zinc oxide | 5.0 | 5.0 | 5.0 | 5.0 | 5.0 | 5.0 |
| Tetrasodium pyrophosphate | — | — | — | — | 0.4 | 0.5 |
| Ammonium polyphosphate | — | — | — | — | 1.7 (b) | 2.2 (b) |
| Aged (14 days at 50°C) | no | no | no | yes (a) | no | no |
| Compound total solids (%) | 76.0 | 76.1 | 75.8 | 76.2 | 74.0 | 74.9 |
| Compound pH | 10.7 | 10.5 | 10.6 | 11.0 | 10.7 | 10.9 |
| Compound visc. Brookfield LVT at 30 rpm (cps) | 625 | 680 | 620 | 550 | 5600 | 1280 |
| Froth to 5× volume (pour wt. 270 gms) on a Model N-50 Hobart mixer with wire whip at speed 2 | | | | | | |
| - Time required (minutes) | 1.5 | 1.85 | 1.9 | 4.8 (c) | 2.5 | 4.25 (c) |
| - Weight/liter of wet foam (gms) | 325 | 312 | 322 | 294 | 295 | 289 |
| Foam spread in layer 0.63 cm thick, gelled for 1 min. at about 35°C under infra-red lamps and then dried and vulcanized for 20 minutes at 149°C in forced-air oven: | | | | | | |
| - Surface appearance of foam rubber | Under gelled | Good, very smooth & dense | Good, very smooth & dense | Good, very smooth & dense | Good, smooth, less dense than 2 & 3 | Good |
| - Surface gloss of foam rubber | — | Very good | Very good | Very good | Fair | Good |
| - Cross-section structure | Slightly coarse | Fine and uniform | Very fine & uniform | Fine and uniform | Fine & Uniform but had a few larger cells | Acceptable but coarse in lower ⅔ |
| Density (lbs/cu.ft.) | — | — | — | 15.2 | — | 15.4 |
| Tensile strength (psi) | — | — | — | 22.5 | — | 16.5 |
| Elongation (%) | — | — | — | 180 | — | 150 |
| Compression resistance at 25% deflection (psi) | — | — | — | 8.6 | — | 8.2 |
| Compression set (%) | — | — | — | 14.3 | — | 13.0 |

(a) — The aged mixture consisted only of the latex + the sulfamate.

(b) — The polyphosphate thickened the latex as indicated by the lower total solids content and the higher viscosity of the latex compound.

(c) — The froth time was longer because pour weight was 650 grams instead of 270 grams.

EXAMPLE 2

Amine-sulfamate heat-gelling latex compositions were prepared from a latex of an oil-resistant rubbery copolyer of butadiene and acrylonitrile (i.e. NBR) containing 20% bound acrylonitrile and a latex comprising a major proportion of particles of a rubbery butadiene-styrene copolymer (i.e. SBR) containing 23% bound styrene and a minor proportion of resinous polystyrene particles. Both latices were stabilized with a mixture of a major amount of a fatty acid soap and a minor amount of a synthetic emulsifier comprising polymerized sodium alkylnaphthalene sulfonate. The butadiene-acrylonitrile polymer latex had a total solids content of about 63% while the latex which contained the rubbery butadiene-styrene copolymer and resinous polystyrene polymer had a total solids content of about 69%. These latex compositions were foamed and tested as shown in Table II. Compound 7 demonstrates the detrimental effect of a known heat-gelling agent, ammonium acetate, on storage. Compounds 8 and 9 show that good performance is obtained in molded foam rubber preparation as well as in spread foams by the ammonium sulfamate heat-gelling system. Compounds 10 and 11 show the good performance of other amine-sulfamates.

polypropylene primary backing tufted with nylon yarn and precoated with a carboxy-SBR latex) at a thickness of about 0.7 cm and over a sheet of woven jute fabric at a thickness of about 1.2 cm in a continuous pilot plant coating operation. After being subjected to a short preheating step in which the temperature of the foam reached 35°–40°C, the foam coated fabrics passed through a forced-air oven held at about 145°–150°C to dry and vulcanize the foam rubber. The final foam rubber had a good surface appearance and gloss and its cross-section structure was very satisfactory. Additionally, a latex composition similar to that in Compound 10 of Table II was tested as described above in the pilot coater. Excellent foam rubber backed fabrics were prepared. These results indicate that excellent foam rubber-backed fabric products can be prepared by means of the amine-sulfamate heat-gelling systems.

EXAMPLE 4

Two amine-sulfamate heat-gelling latex compositions (Compounds 12 and 13) were prepared from the SBR

TABLE II

| Compound No. | 7 | 8 | 9 | 10 | 11 |
|---|---|---|---|---|---|
| NBR latex | — | 100.0 | — | — | — |
| SBR latex | 100.0 | — | 100.0 | 100.0 | 100.0 |
| Ammonium sulfamate | — | 3.6 | 4.0 | — | — |
| Monoethanolamine sulfamate | — | — | — | 4.0 | — |
| Monoisopropanolamine sulfamate | — | — | — | — | 4.4 |
| Potassium oleate | 1.5 | 2.0 | 2.0 | 2.0 | 2.0 |
| Triethyl triethylene triamine | 1.0 | 1.3 | 1.3 | 1.3 | 1.3 |
| Ammonia | 1.0 | 1.2 | 1.2 | 0.8 | 0.8 |
| Potassium hydroxide | 0.2 | — | — | — | — |
| Zinc diethyldithiocarbamate | 1.5 | 1.5 | 1.5 | 1.5 | 1.5 |
| Zinc mercaptobenzothiazole | 1.0 | 1.0 | 1.0 | 1.0 | 1.0 |
| Sulfur | 2.0 | 2.0 | 2.0 | 2.0 | 2.0 |
| Polymeric hindered phenol | 1.5 | 1.5 | 1.5 | 1.5 | 1.5 |
| Silicone surfactant | 0.25 | 0.25 | 0.25 | 0.25 | 0.25 |
| Zinc oxide | 5.0 | 5.0 | 5.0 | 4.0 | 4.0 |
| Aluminum silicate | 100.0 | 100.0 | 100.0 | 100.0 | 100.0 |
| Aluminum trihydrate | 25.0 | 25.0 | 25.0 | 25.0 | 25.0 |
| Ammonium acetate | 1.75 | — | — | — | — |
| Compound total solids (%) | 76.6 | 73.8 | 77.0 | 77.4 | 77.0 |
| Compound pH | 10.4 | 11.1 | 10.8 | 10.6 | 10.6 |
| Compound visc. Brookfield LVT at 30 rpm (cps) | 1040 | 310 | 750 | 1180 | 1140 |
| Stability after storage for 4 days at 22–26°C | Unstable | Stable | Stable | Stable | Stable |
| Gelation of 0.63 cm thick foam layer when heated for 1 minute at 30–40°C | Did not foam & gel properly | Good | Good | Good | Good |
| Gelation of foam in 2.54 cm thick closed mold heated to 50–100°C | Not tested | Good | Good | Not tested | Not tested |

EXAMPLE 3

The latex composition similar to Compound 9 of Table II was foamed to about 4.9 times its volume and spread over the underside of a carpet (woven ribbon latex of Example 2 to illustrate that good results may be obtained with use of the less volatile amines 1,2-diamino propane and monoisopropanolamine along with the ammonia. The results are recorded in Table III.

TABLE III

| Compound No. | 12 | 13 |
|---|---|---|
| SBR latex | 100.0 | 100.0 |
| Ammonium sulfamate | 2.8 | — |
| 1,2-diamino propane | 1.0 | — |
| Monoisopropanolamine sulfamate | — | 4.4 |
| Monoisopropanolamine | — | 1.5 |
| Potassium oleate | 2.0 | 2.0 |
| Triethyl triethylene triamine | 1.3 | 1.3 |
| Ammonia | 1.0 | 0.8 |
| Zinc diethyldithiocarbamate | 1.5 | 1.5 |
| Zinc mercaptobenzothiazole | 1.0 | 1.0 |
| Sulfur | 2.0 | 2.0 |
| Polymeric hindered phenol | 1.5 | 1.5 |
| Silicone surfactant | 0.25 | 0.25 |
| Zinc oxide | 5.0 | 4.0 |
| Aluminum silicate | 100.0 | 100.0 |
| Aluminum trihydrate | 25.0 | 25.0 |
| Compound total solids (%) | 77.3 | 77.0 |
| Compound pH | 11.0 | 10.6 |
| Compound visc. Brookfield LVT at 30 rpm (cps) | 1000 | 1140 |
| Stability after storage for 4 days at 22–26°C | Stable | Stable |
| Gelation of 0.63 cm thick foam layer when heated for 1 minute at 30–40°C | Good | Good |

What is claimed is:

1. A process for preparing a sheet-like product from a heat gelling latex composition which comprises compounding a natural rubber latex or a latex of a rubbery homo- or copolymer of a $C_4$–$C_{10}$ conjugated diene, said latices being stabilized with emulsifying agents which form water-insoluble compounds on reaction with zinc and cadmium ions, with (a) 0.2–30 parts of an amine sulfamate which hydrolyzes in water when the temperature is raised but which is characterized by little or no hydrolysis in water at ambient temperatures and being one in which the amine radical is derived from an amine which has a boiling point in the range of −35°C to +300°C, (b) 0.5–20 parts of a zinc or cadmium ion donor compound, (c) ammonia or an ammonia donor compound to provide 0.1–4.0 parts of ammonia, (d) 0–5 parts of an emulsifier which does not react with zinc and cadmium ions to form water-insoluble compounds and (e) a vulcanization system for the rubbery polymer, said parts being parts by weight per 100 parts by weight of rubbery polymer, adjusting the pH to a value of at least 8.0, foaming and shaping the latex composition into a sheet form and heating it to dry and vulcanize it.

2. A process according to claim 1 in which the amine radical of the amine sulfamate is derived from an amine which has a boiling point of −35°C to +175°C and in which the latex composition is foamed before being shaped into the sheet form.

3. A process according to claim 2 in which the component in (a) is ammonium sulfamate and it is added in amount of 0.2–8 parts, the component in (b) is zinc oxide and it is added in amount of 2–10 parts, the component in (c) is ammonium hydroxide and it is added in amount to provide 0.3–2.0 parts of ammonia and the pH is adjusted to at least 10.0 with an ammonia donor compound.

4. A process according to claim 3 in which 0.01–4 parts of a $C_1$–$C_8$ alkyl or alkanol amine containing 1–5 amino groups is included as replacement for part of the ammonia donor compound.

5. A process according to claim 2 in which the amount of added non-reactive emulsifier component (d) is zero, the amine sulfamate component in (a) is monoethanolamine or monoisopropanolamine sulfamate and it is present in amount of 1–15 parts.

6. A process according to claim 2 in which the latex is a latex of a rubbery homopolymer of a $C_4$–$C_{10}$ conjugated diene or a copolymer of a $C_4$–$C_{10}$ conjugated diene with a copolymerizable monomer containing a $CH_2 = C<$ group.

7. A process according to claim 6 in which the latex is blended with a minor proportion of a latex of a resinous polymer.

8. A process according to claim 6 in which a water soluble alkali metal or amine salt of a rosin acid or a $C_5$–$C_{20}$ saturated or unsaturated carboxylic acid forms the major proportion of the emulsifier in the latex.

9. A process according to claim 6 in which the latex is a latex of a rubbery copolymer of butadiene with styrene or acrylonitrile.

10. The product of the process of claim 2.

* * * * *